(12) United States Patent
Lindner

(10) Patent No.: US 11,559,137 B2
(45) Date of Patent: Jan. 24, 2023

(54) FASTENING DEVICE AND TABLE HAVING SUCH A FASTENING DEVICE

(71) Applicant: Kesseböhmer Holding KG, Bad Essen (DE)

(72) Inventor: Frank Lindner, Weilheim a.d. Teck (DE)

(73) Assignee: Kesseböhmer Holding KG, Bad Essen (DE)

( * ) Notice: Subject to any disclaimer, the term of this patent is extended or adjusted under 35 U.S.C. 154(b) by 53 days.

(21) Appl. No.: 17/119,188

(22) Filed: Dec. 11, 2020

(65) Prior Publication Data

US 2021/0177137 A1    Jun. 17, 2021

(30) Foreign Application Priority Data

Dec. 13, 2019  (DE) ..................... 10 2019 219 588.1

(51) Int. Cl.
*A47B 13/00*    (2006.01)
*F16B 12/10*    (2006.01)

(52) U.S. Cl.
CPC ............ *A47B 13/003* (2013.01); *F16B 12/10* (2013.01); *A47B 2013/006* (2013.01)

(58) Field of Classification Search
CPC ................ A47B 13/003; A47B 13/081; A47B 2013/006; F16B 12/10
See application file for complete search history.

(56) References Cited

U.S. PATENT DOCUMENTS 2,954,638 A * 10/1960 Motter ...................... F16B 2/14
                                                     403/319
3,504,877 A *  4/1970 Lyon, Sr. .............. A47B 13/021
                                                     248/188

(Continued)

FOREIGN PATENT DOCUMENTS

DE    20 2009 010 593 U1    11/2009
DE    10 2009 036 205 A1    2/2011

(Continued)

OTHER PUBLICATIONS

Translation of DE 10 2009 036 205 from espacenet.com (Year: 2021).*

(Continued)

*Primary Examiner* — Daniel J Rohrhoff
(74) *Attorney, Agent, or Firm* — Potomac Law Group, PLLC; John J. Penny, Jr.

(57) ABSTRACT

For a flexible fastening, a fastening device for fastening a column to a support device comprises: a column plate which can be fastened to one end of the column and an accommodation device which can be fastened to the support device. The accommodation device has a longitudinal shape with a longitudinal direction and a predetermined length in the longitudinal direction and a cross-section, whereby an accommodation space configured to accommodate the column plate in a manner shiftable in the longitudinal direction and in an exactly fitting manner in the direction perpendicular to the longitudinal direction is formed. The fastening device comprises a fastening member configured to fasten the column plate to the accommodation device along the longitudinal direction, and, in the longitudinal direction, the column plate has a dimension which is smaller than the predetermined length in a state mounted in the fastening device.

11 Claims, 4 Drawing Sheets

(56) References Cited

U.S. PATENT DOCUMENTS

| | | | | |
|---|---|---|---|---|
| 5,549,055 A * | 8/1996 | Kusch | ............... | A47B 13/003 |
| | | | | 108/115 |
| 6,006,679 A * | 12/1999 | Lin | ..................... | A47B 3/02 |
| | | | | 108/157.15 |
| 2010/0012001 A1* | 1/2010 | Liu | ................... | A47B 13/003 |
| | | | | 108/157.16 |
| 2013/0037667 A1* | 2/2013 | Goldin | ............... | A47B 13/003 |
| | | | | 248/221.11 |
| 2013/0180099 A1* | 7/2013 | Weaker | ............... | F16B 12/44 |
| | | | | 29/525.11 |
| 2019/0191868 A1* | 6/2019 | Bowser | ............. | A47B 87/002 |

FOREIGN PATENT DOCUMENTS

| | | |
|---|---|---|
| DE | 20 2016 002 581 U1 | 6/2016 |
| WO | 2019058201 A1 | 3/2019 |

OTHER PUBLICATIONS

Extended European Search Report issued in connection with corresponding European Application No. 20204079.6 dated Mar. 30, 2021.

* cited by examiner

FASTENING DEVICE AND TABLE HAVING SUCH A FASTENING DEVICE

The invention relates to a fastening device and a table having such a fastening device, in particular, the fastening device as an accommodation device for fastening a column, as a table leg, to a support device of the table.

In the office field and in the caravan technique, support device systems which shall be used for modular elements are often used. Therefore, for example, the request is that a column is fastened to a tabletop, however, this tabletop shall be exchangeable. In particular, in the caravan field, support device systems which can additionally be used in a multi-functional manner so that, e.g., a tabletop fastened to the column can be exchanged with a bedframe are requested. Furthermore, the customer requirements are mainly directed such that a functionality shall be combined with aesthetics, reliability, simplicity of the handling, and a space-saving solution.

In particular, in the field of support systems, these requirements raise problems for the designers since compromises concerning one of this criteria must often be done. This problem particularly occurs with support systems which shall be able to be combined with retrofittable systems or which shall be adapted individually to different circles of customers. For such systems, screws or wing screws are often used for fastening the components. However, this solution is not attractive in the implementation and, therefore, it forms a compromise with respect to the aesthetics. Furthermore, a protruding part, for example, a screw, always involves danger of injury. Except from that, a modification of such a system is often time-consuming and laborious.

In order to solve these problems, a clamping system in which a fastening device which presses, for example, a column plate at an upper end of the column towards a bottom side of the tabletop by means of a cam and, therefore, clamps it, is provided is known from the state-of-the-art. For a defined position of the column with respect to the tabletop, the fastening device comprises a stop element on which the column plate abuts. In this position, the column plate is clamped and, therefore, fastened on the tabletop at the defined position.

However, this fastening involves the disadvantage that, by the defined position determined in such manner, the tabletop is deformed when the requirement to the tabletop, e.g., a later eccentric installation of heavy apparatuses on the tabletop, changes. Except from that, as the case may be, by an eccentric load, telescopic columns of a height-adjustable tabletop are burdened by a large moment which causes greater wear. Finally, the defined position of the column on the tabletop for tabletops having different sizes and shapes has to be defined in advanced which again causes an enlarged effort.

At least one embodiment of the invention is based on the object to eliminate the above disadvantages and to provide a fastening system and a table enabling a flexible positioning of a column with respect to a tabletop.

According to an aspect of at least one embodiment of the invention, a fastening device for fastening a column to a support device comprises a column plate which can be fastened to an end of the column and an accommodation device which can be fastened to the support device. The accommodation device has a longitudinal shape having a longitudinal direction with a predetermined length in the longitudinal direction and such a cross-section that an accommodation space configured to accommodate the column plate in a manner shiftable in the longitudinal direction and fitting exactly in the directions across or perpendicular to the longitudinal direction is formed. The fastening device further comprises a fastening member configured to fasten the column plate to the accommodation device at an arbitrary place along the longitudinal direction, and the column plate, in a state fastened to the fastening device, has a dimension in the longitudinal direction of the accommodation device smaller than the predetermined length of the accommodation device.

Such a fastening device enables fastening of the column to the support device, which can be formed as a tabletop, along the longitudinal direction of the accommodation device, at an arbitrary position suitable for this application by means of the column plate. Thereby, occurring forces and moments can be minimized and deformations and wear can be prevented or reduced. By an according formation of the fastening member, fastening of the column can easily be released again and the column can be fastened at another, as of the case may be, more suitable position along the accommodation device without the need of relocating the accommodation device on the support device.

According to an advantageous further development of the fastening device, the accommodation space extends over the entire length of the accommodation device so that the column plate can be shifted in the longitudinal direction within the entire predetermined length of the accommodation space.

Thereby, the highest possible flexibility of the column in view of the position in the longitudinal direction of the accommodation device is possible.

In a further advantageous implementation of the fastening device, the accommodation device comprises three walls being at least sectionally continuous in the longitudinal direction as well as a wall comprising a continuous slit in the longitudinal direction in order to form the accommodation space, wherein inner dimensions of the accommodation space perpendicular to the longitudinal direction are predetermined such that the column plate is provided in the accommodation space in an almost backlash free manner.

By the three at least sectionally continuous walls and the wall comprising the continuous slit, the provision of the accommodation device having an appropriate strength and stiffness is enabled. The almost backlash free accommodation of the column plate in the accommodation space means that, in the directions perpendicular to the longitudinal direction of the accommodation device, a difference of a dimension of the column plate and an inner dimension of the accommodation space is chosen such that the column plate can be shifted freely in the accommodation device in the longitudinal direction, however, perpendicular to the longitudinal direction, as possible, no backlash exists.

Upon a further advantageous implementation of the fastening device, the accommodation space comprises two opposite first walls being shorter than an intermediate second wall and the continuous slit is provided in a further second wall located between the first walls.

By the walls, the accommodation space in which the column plate can be accommodated for the backlash free accommodation is formed. A continuous slit is provided for a protrusion of the column from the accommodation space. By the provision of the continuous slit in one of the longer walls, the height of the accommodation space, and, therefore, also of the accommodation device, can be chosen small. Therefore, no unnecessary installation space is required so that, for example, attaching an accessory on the bottom side of the tabletop is possible or design requirements can be fulfilled.

According to a further advantageous implementation of the fastening device, the end portions, adjacent to the continuous slit, of the one of the second walls are formed such that they protrude towards the other one of the second walls.

Since these end portions protrude towards the other second wall, the stiffness and strength of the accommodation device are enlarged and a chamber respectively open towards the accommodation space is formed so that there is the option to accommodate the fastening member in this chamber at a determined position perpendicular to the longitudinal direction of the accommodation device.

Upon a further advantageous implementation of the fastening device, the accommodation device can be made of steel.

The selection of this material provides a high strength and stiffness also for small wall thicknesses and, therefore, low material input.

In a further advantageous implementation of the fastening device, the fastening member is configured such that the column plate is clamped in one of the directions perpendicular with respect to the longitudinal direction in the accommodation space.

By the clamping of the column plate in the accommodation space, in particular, when clamping in direction to the support device, the zero backlash in this direction is ensured so that a solid fastening of the column to the support device is possible. By the clamping, it is further possible to simply release again the fastening without damaging components and to fasten the column at another position on the support device.

According to an advantageous implementation of the fastening device, the fastening device can comprise a clamping screw The clamping screw is a cheap clamping means which can simply be purchased with the requested characteristics.

According to another advantageous implementation of the fastening device, the fastening member comprises a cam-shaped or elliptical clamping element.

By the cam-shaped or elliptical clamping element, there is the option that the clamping can be executed fast and sure by means of a motion with low amount.

In a further advantageous implementation of the fastening device, the accommodation device comprises a fixing device by means of which the accommodation device can be fastened on the support device in a shiftable manner in the direction perpendicular to the longitudinal direction of the accommodation device.

By this fixing device by means of which the accommodation device can be shifted in a direction across or perpendicular to its longitudinal direction, it is possible to further enlarge the flexibility in view of the fixation of the column on the support device since. Thereby, the fastening position of the column on the support device in connection with the relocatability in the longitudinal direction can be chosen in a two-dimensional manner and the position of the column on the support device can be even better adjusted to the requirements.

According to a further advantageous implementation of the fastening device, along the support device, the fixing device comprises elongated holes having a translational range across the longitudinal direction of the accommodation device.

The elongated holes in which, for example, screws fastened in the accommodation device can be shifted across the longitudinal direction of the accommodation device can be easily and cost-effectively inserted into the accommodation device.

According to a further aspect of at least one embodiment of the invention, a table comprises a support device, a column, and a fastening device in which, in a state fastened in the fastening device, the column plate has a dimension smaller than the predetermined length of the accommodation device in the longitudinal direction of the accommodation device.

This table enables fastening of the column to the support device in an arbitrary position suitable for this specific application along the longitudinal direction of the accommodation device by means of the column plate by the fastening member. Thereby, occurring forces and moments can be minimized and deformations and wear can be prevented or reduced. Except from that, by an appropriate formation of the fastening member, fastening of the column can be easily released again and the column can be fastened at another, potentially more suitable, position without the need of relocating the accommodation device on the support device.

In an advantageous implementation of the table, the support device has a predetermined length and the predetermined length of the accommodation device corresponds almost to the length of the support device so that the column plate can be shifted over almost the entire length of the support device.

Thereby, there is the option to fasten the column at a suitable place along the almost entire length of the support device or to fasten several columns at several suitable places along the almost entire length of the support device. "Corresponding to the almost entire length of the support device" means that, at the edge of the support device, if necessary, design elements or functional elements can be provided so that the accommodation device does not reach completely to the outer edges of the support device.

According to a further advantageous implementation of the table, the table comprises no stop element such that a motion of the column plate can be stopped by the stop element in the area of the fastening device.

Thereby, in the accommodation space, the column plate can be brought into an arbitrary position in the longitudinal direction of the accommodation device without the need of, for example, removing the column plate from the accommodation device and renewed inserting from another side into the accommodation device in order to fasten the column plate to the accommodation device in the arbitrary position.

Below, referring to the attached drawings, the invention is elucidated in detail by means of embodiments.

In particular,

Figure 1:
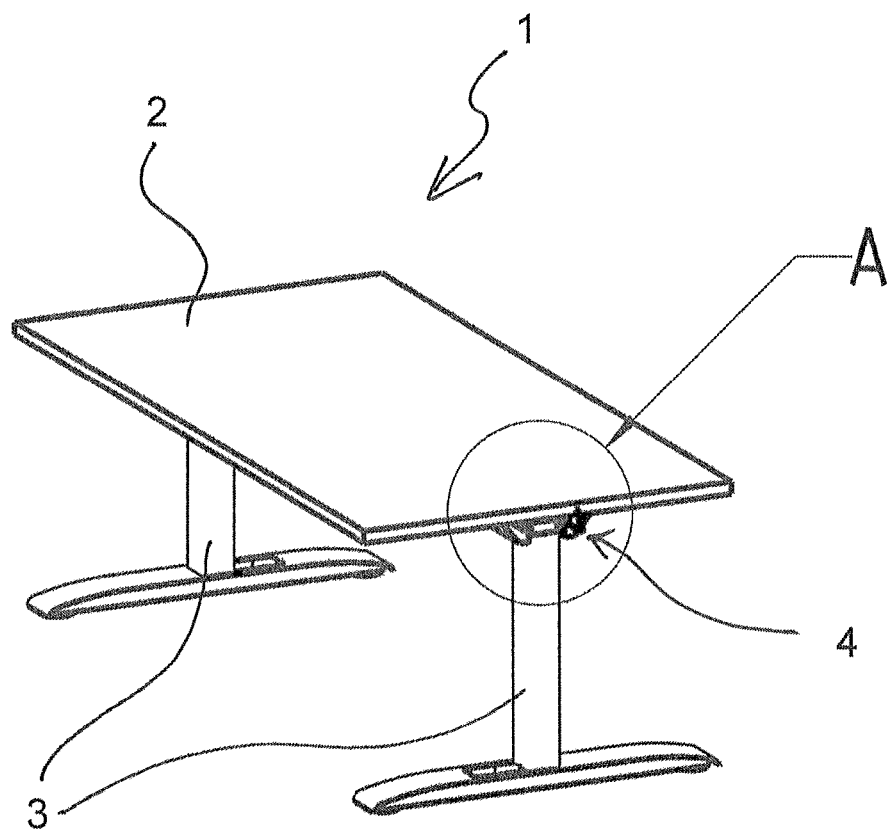
FIG. 1 shows a table as a support unit in an assembled state.

FIG. 1 shows a furniture, namely a table 1, as a support unit in an assembled state. The table 1 comprises a tabletop such as a support device 2 and two columns 3. In alternative embodiments, the table 1 comprises another number of columns, namely, either only one column or more than two columns. Further, the table 1 comprises a fastening device 4 for fastening the column 3 to the support device 2. The fastening device 4 is provided along an entire length of the support device 2. Alternatively, the length of the fastening device 4 can also correspond only almost to the length of the support device 2, or it has a length which is substantially shorter than the length of the support device 2. Furthermore, alternatively, there is the option that several fastening devices 4 are provided.

Neither on the support device 2 nor on the fastening device 4, the table 1 comprises a stop element, so that a motion of the column 3 along a longitudinal direction of the fastening device 4 is not stopped by any stop element.

Figure 2:
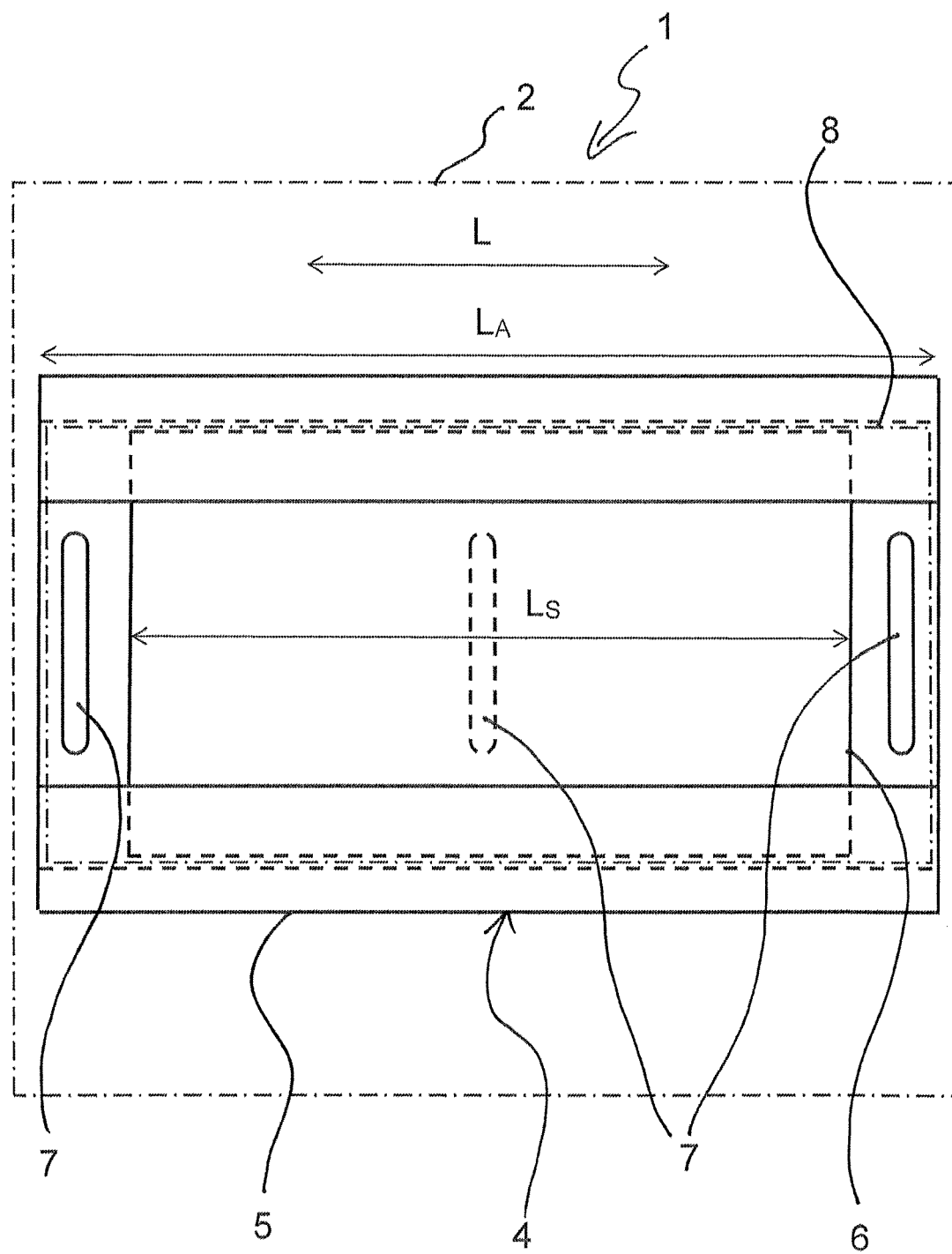
FIG. 2 shows a view from below of the table having a fastening device, without column.
Figure 3:
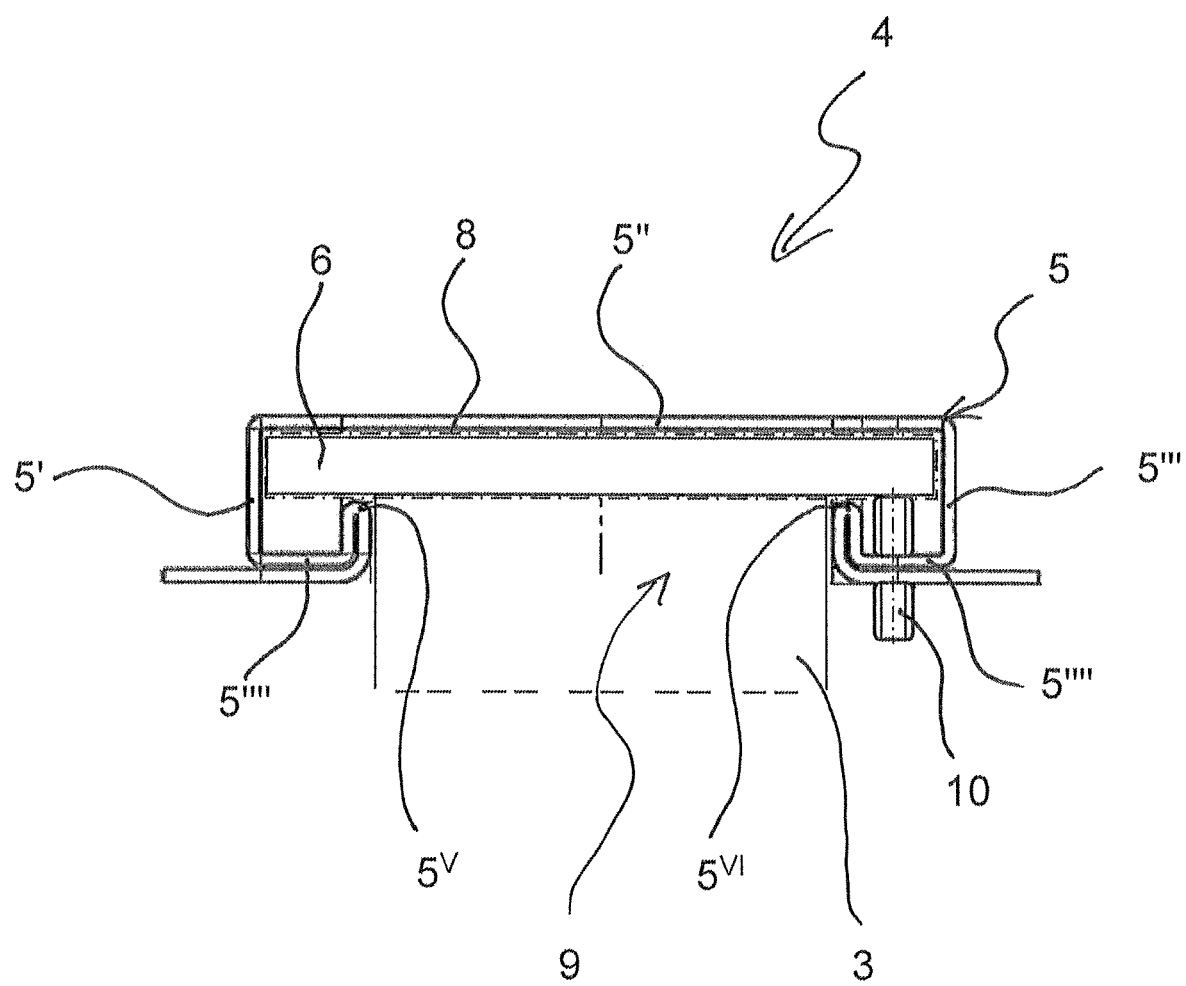
FIG. 3 shows a cross-section of a fastening device according to a first embodiment.

FIGS. 2 and 3 show a view of the table 1 having the fastening device 4 or the fastening device 4 and a column plate 6 of a column 3 (only illustrated in FIG. 3) from below and from the side, respectively. The fastening device 4 comprises an accommodation device 5 and, furthermore, a column plate 6. The accommodation device 5 and, therefore, also the fastening device 4 have a longitudinal shape extending in a longitudinal direction L and the accommodation device 5 has a pre-defined length $L_A$ in the longitudinal direction L and it is fastened to the bottom of the support device 2, therefore, on the tabletop here.

The column plate 6 is basically shiftable in the longitudinal direction L and, as to be seen in FIG. 2, it has a dimension $L_S$ which is smaller than the predetermined length $L_A$ of the accommodation device 5 in the longitudinal direction L. In the present embodiment, the predetermined length $L_A$ of the accommodation device 5 is shorter than the support device 2, however, it can alternatively also have the same length. Further, alternatively, also several columns 3 can be fastened to the accommodation device 5 via a respective column plate 6.

Moreover, in this embodiment, the fastening device 4 comprises four elongated holes as a fixation device 7 for fastening the accommodation device 5 to the support device 2. Along the support device 2, the elongated holes extend across or perpendicular to the longitudinal direction L of the accommodation device 5, therefore, they also have a shifting range across or perpendicular to the longitudinal direction L of the accommodation device 5. By this fixation device 7, the accommodation device 5 can be fastened shiftable in a direction across or perpendicular to the longitudinal direction L of the accommodation device 5 to the support device 2 by means of bolts. In alternative embodiments, no fixation device 7 enabling the shifting across to the longitudinal direction L is provided or the fixation device 7 is formed in another form, e.g., as rails.

FIG. 3 shows a cross-section of the fastening device 4 according to a first embodiment having the accommodation device 5 and the column plate 6. The column plate 6 is fastened at one end of the column 3.

The accommodation device 5 has a cross-section comprising an accommodation space 8 illustrated by a dot-dash line in FIG. 3, wherein the accommodation space 8 accommodates the column plate 6 in a shiftable manner in the longitudinal direction L and in an exactly fitting manner in the direction across or perpendicular to the longitudinal direction L. The cross-section of the accommodation device 5 comprises three continuous walls or wall portions 5', 5", 5''' which, as shown in FIG. 3, form a reverse U, therefore, two shank portions 5' and 5''' connected to one another by the web portion 5". Wall portions 5"" which, indeed, are directed towards each other, form an opening having the dimensions of the column 3 so that the column 3 fits through the slit 9 formed thereby. The wall portions 5"" are respectively associated to the lower shank portions of the wall portions 5' and 5'''. The slit 9 passes continuously in the longitudinal direction L. This accommodation space 8 itself is therefore formed by the two opposite first short wall portions 5', 5''', the web portion 5" connecting them as well as the two opposite wall portions 5"", 5"" and, imaginary, the slit 9. The accommodation device 5 can be made of steel.

In alternative embodiments, the cross-section of the accommodation device 5 has another shape and/or is formed by other elements of the accommodation device 5 in order to form the accommodation space 8, for example, having an oval shape. Further, alternatively, the three continuous walls 5', 5", 5''' are provided in sections with open spaces in their length course along the length L. Furthermore, in an alternative embodiment, the accommodation device 5 is not made of steel but, for example, of an aluminum extruded profile.

The column plate 6 is accommodated in an almost backlash free manner in the accommodation space 8, wherein, in directions perpendicular to the longitudinal direction L of the accommodation device 5, a difference between an outer dimension of the column plate 6 and an inner dimension of the accommodation space 8 is chosen such that the column plate 6 can freely be shifted in the longitudinal direction L in the accommodation device, however, as possible, no backlash exists perpendicular to the longitudinal direction L.

As to be seen in FIG. 2, the accommodation space 8 extends along the entire predetermined length $L_A$ of the accommodation device 5 so that the column plate 6 is shiftable in the longitudinal direction L within the accommodation space 8. Merely for the sake of a clear illustration of the accommodation space 8, the accommodation space 8 is illustrated slightly shorter.

In FIG. 3, a fastening member 10 fastening the column plate 6 to the accommodation device 5 at an arbitrary position in the longitudinal direction L is shown. The fastening member 10 comprises a clamping screw. Further, through holes as fastening member 10 having threads into which the clamping screw can be screwed in are provided in the wall portions 5"" and the end of the screw is screwed against the column plate 6 when screwed in. The fastening member 10 therefore clamps the column plate 6 in the accommodation space 8 in one of the directions perpendicular to the longitudinal direction L. The column plate 6 is clamped against the second wall 5" in a vertical direction in FIG. 3, however, it can also alternatively be clamped in the vertical direction against the second wall 5"" or in a horizontal direction in FIG. 3 against one of the first walls 5', 5'''.

End portions $5^V$ and $5^{VI}$ of the one second wall 5"" are formed by folding a material of the second wall 5"". The end portions $5^V$, $5^{VI}$ protrude towards the second wall 5". Thereby, the spaces 11 between the one second wall 5"" and the accommodation space 8 are formed.

Figure 4:
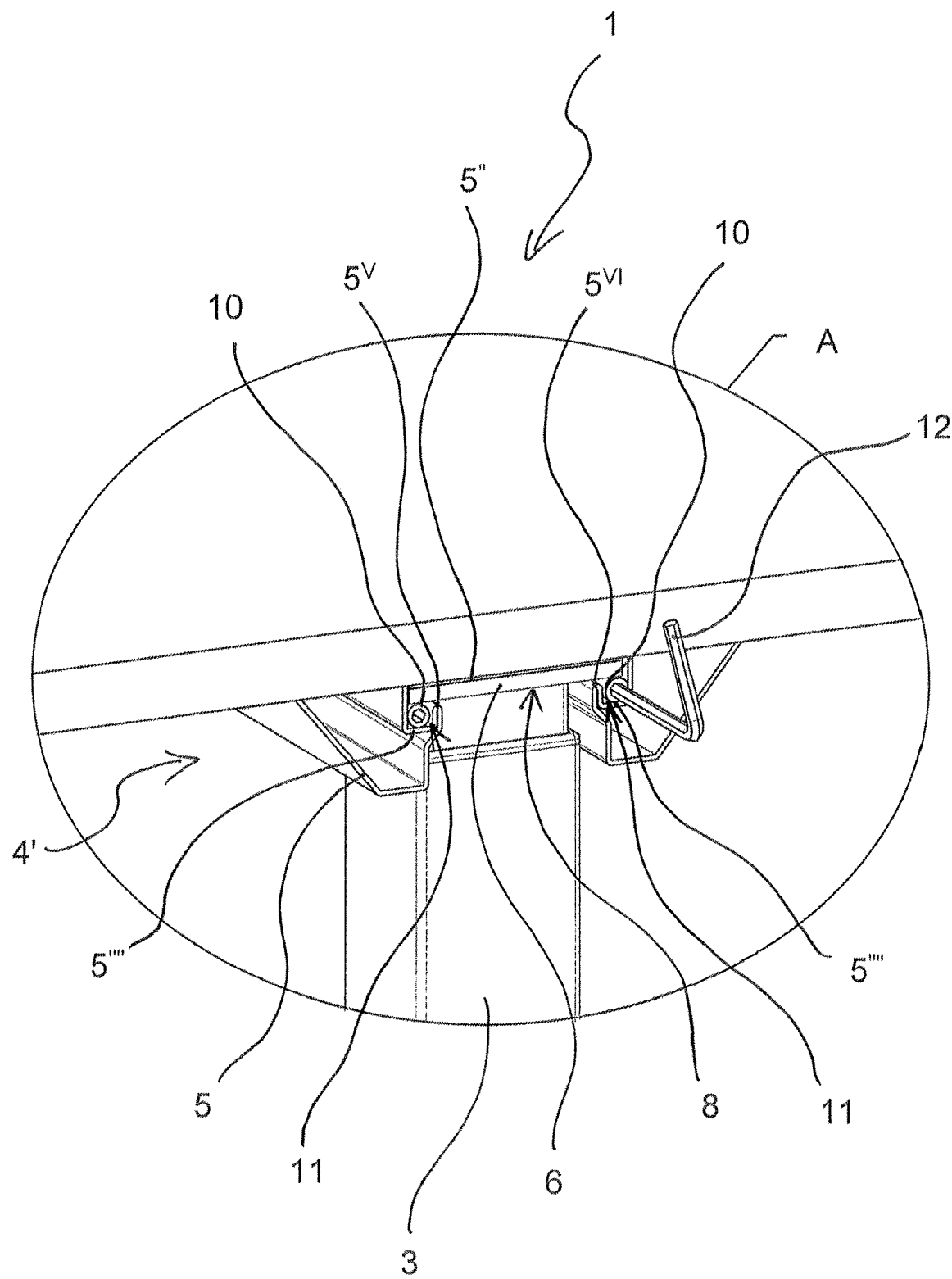
FIG. 4 shows an isometric view of the portion A marked in FIG. 1 of the table having a fastening device according to a second embodiment.

FIG. 4 shows an isometric view of the portion A marked in FIG. 1 of the table 1 having a fastening device 4' according to a second embodiment.

The fastening device 4' according to the second embodiment differs from the fastening device 4 according to the first embodiment merely therein that outer areas of the cross-section of the accommodation device 5 differ, wherein the accommodation space 8 is analogously provided. By the end portions $5^V$, $5^{VI}$ of the one second wall 5"" protruding towards the other one of the second wall 5", spaces 11 between the one second wall 5"" and the accommodation space 8 are formed. In these spaces 11, an elliptic clamping element is respectively provided as the fastening member 10. Alternatively, also a cam-shaped clamping element can be provided as the fastening member 10.

The elliptic clamping element is twisted by means of a tool 12 such that the column plate 6 is thereby clamped against the second wall 5".

In use, the column plate 6 with the column 3 mounted thereto is pushed into the accommodation device 5. As soon as the column 3 and, therefore, also the column plate 6, are located at a suitable place in the longitudinal direction L of the accommodation device 5, the column plate 6 is fastened to the accommodation device 5 by means of the fastening member 10.

Optionally, in advance, the accommodation device 5 is fastened to the support device 2 by means of the fixation device 7 at a suitable position in the direction perpendicular to the longitudinal direction L of the accommodation device 5.

For a subsequence change of the position of the column 3, the fastening member 10 is released, the column 3 with the column plate 6 is shifted to another suitable position in the longitudinal direction L of the accommodation device 5, and it is fastened again by means of the fastening member 10.

As an alternative with respect to the first embodiment, the geometry of the accommodation device 5 can be formed analogously to the second embodiment. However, then, the through hole is not provided with the thread and the fastening member 10 is formed as clamping screw which is screwed by means of a nut (not shown) laid in between the wall portion 5"" and the column plate 6. Therefore, the clamping screw can support at the upper side of the wall portion 5"" by means of the nut and the end of the screw can push against the column plate.

All features illustrated in the description, the subsequent claims and the drawing can be essential solitarily or also in an arbitrary combination for the invention.

The invention claimed is:

1. A fastening device for fastening a column to a support device, wherein the fastening device comprises:
   a column plate fastened at one end of the column,
   an accommodation device configured to be fastened to the support device, wherein the accommodation device has a predetermined length in a longitudinal direction and an accommodation space formed by a cross section thereof and the predetermined length, the accommodation space being configured to accommodate the column plate in a shiftable manner in the longitudinal direction and in a fitting manner in a direction perpendicular to the longitudinal direction, and
   a fastening member configured to fasten the column plate to the accommodation device at an arbitrary place along the longitudinal direction, wherein
   the column plate has a dimension that is smaller than the predetermined length of the accommodation device in the longitudinal direction of the accommodation device,
   the accommodation device comprises a fixation device that fastens the accommodation device to the support device in a shiftable manner in a direction perpendicular to the longitudinal direction of the accommodation device, and
   the fixation device comprises elongated holes having a shifting range extending perpendicular to the longitudinal direction of the accommodation device.

2. The fastening device according to claim 1, wherein the accommodation space extends in the longitudinal direction across the predetermined length of the accommodation device so that the column plate is shiftable within the predetermined length of the accommodation device in the longitudinal direction.

3. The fastening device according to claim 1, wherein, the accommodation device comprises three walls at least sectionally continuous in the longitudinal direction that form the accommodation space and a wall forming a continuous slit that extends in the longitudinal direction for receiving the column, wherein inner dimensions of the accommodation space perpendicular to the longitudinal direction are predetermined such that the column plate is provided in an almost backlash free manner in the accommodation space.

4. The fastening device according to claim 1, wherein the accommodation space comprises two opposite first walls extending from an intermediate second wall, and a continuous slit is provided in between second walls located between the first walls.

5. The fastening device according to claim 4, wherein end portions are formed in the second walls such that they protrude towards the intermediate second wall.

6. The fastening device according to claim 1, wherein the accommodation device is made of steel.

7. The fastening device according to claim 1, wherein the fastening member is configured to clamp the column plate (6) in one of the directions perpendicular to the longitudinal direction of the accommodation space.

8. The fastening device according to claim 7, wherein the fastening member comprises a clamping screw.

9. The fastening device according to claim 7, wherein the fastening member comprises a cam-shaped or elliptic clamping element.

10. A table having a support device, a column, and a fastening device for fastening a column to a support device, wherein the fastening device comprises:
    a column plate fastened at one end of the column,
    an accommodation device configured to be fastened to the support device, wherein the accommodation device has a predetermined length in a longitudinal direction and an accommodation space formed by a cross section thereof and the predetermined length, the accommodation space being configured to accommodate the column plate in a shiftable manner in the longitudinal direction and in a fitting manner in a direction perpendicular to the longitudinal direction, and
    a fastening member configured to fasten the column plate to the accommodation device at an arbitrary place along the longitudinal direction, wherein
    the column plate has a dimension that is smaller than the predetermined length of the accommodation device in the longitudinal direction of the accommodation device, wherein
    the table does not comprise a stop element such that the column plate can freely be shifted in the longitudinal direction in the accommodation device in an area of the fastening device, and
    the fastening member comprises a clamping screw configured to be screwed against the column plate, and a through hole having threads into which the clamping screw can be screwed.

11. The table according to claim 10, wherein the support device has a predetermined length and the predetermined length of the accommodation device is almost the length of the support device so that the column plate can be shifted almost the entire length of the support device.

* * * * *